United States Patent [19]
Chao et al.

[11] 3,986,490
[45] Oct. 19, 1976

[54] REDUCING HEAT LOSS FROM THE ENERGY ABSORBER OF A SOLAR COLLECTOR

[75] Inventors: Bei Tse Chao, Urbana; Ari Rabl, Downers Grove, both of Ill.

[73] Assignee: The United States of America as represented by the United States Energy Research and Development Administration, Washington, D.C.

[22] Filed: July 24, 1975

[21] Appl. No.: 598,971

[52] U.S. Cl. .................................. 126/270; 126/271
[51] Int. Cl.² ............................................ F24J 3/02
[58] Field of Search ............ 126/270, 271; 237/1 A

[56] References Cited
UNITED STATES PATENTS

| | | | |
|---|---|---|---|
| 3,884,217 | 5/1975 | Wartes | 126/270 |
| 3,923,039 | 12/1975 | Falbel | 126/271 |
| 3,923,381 | 12/1975 | Winston | 126/271 |

*Primary Examiner*—Kenneth W. Sprague
*Attorney, Agent, or Firm*—John A. Horan; Arthur A. Churm; Paul A. Gottlieb

[57] ABSTRACT

A device is provided for reducing convective heat loss in a cylindrical radiant energy collector. It includes a curved reflective wall in the shape of the arc of a circle positioned on the opposite side of the exit aperture from the reflective side walls of the collector. Radiant energy exiting the exit aperture is directed by the curved wall onto an energy absorber such that the portion of the absorber upon which the energy is directed faces downward to reduce convective heat loss from the absorber.

5 Claims, 4 Drawing Figures

U.S. Patent   Oct. 19, 1976   Sheet 1 of 2   3,986,490
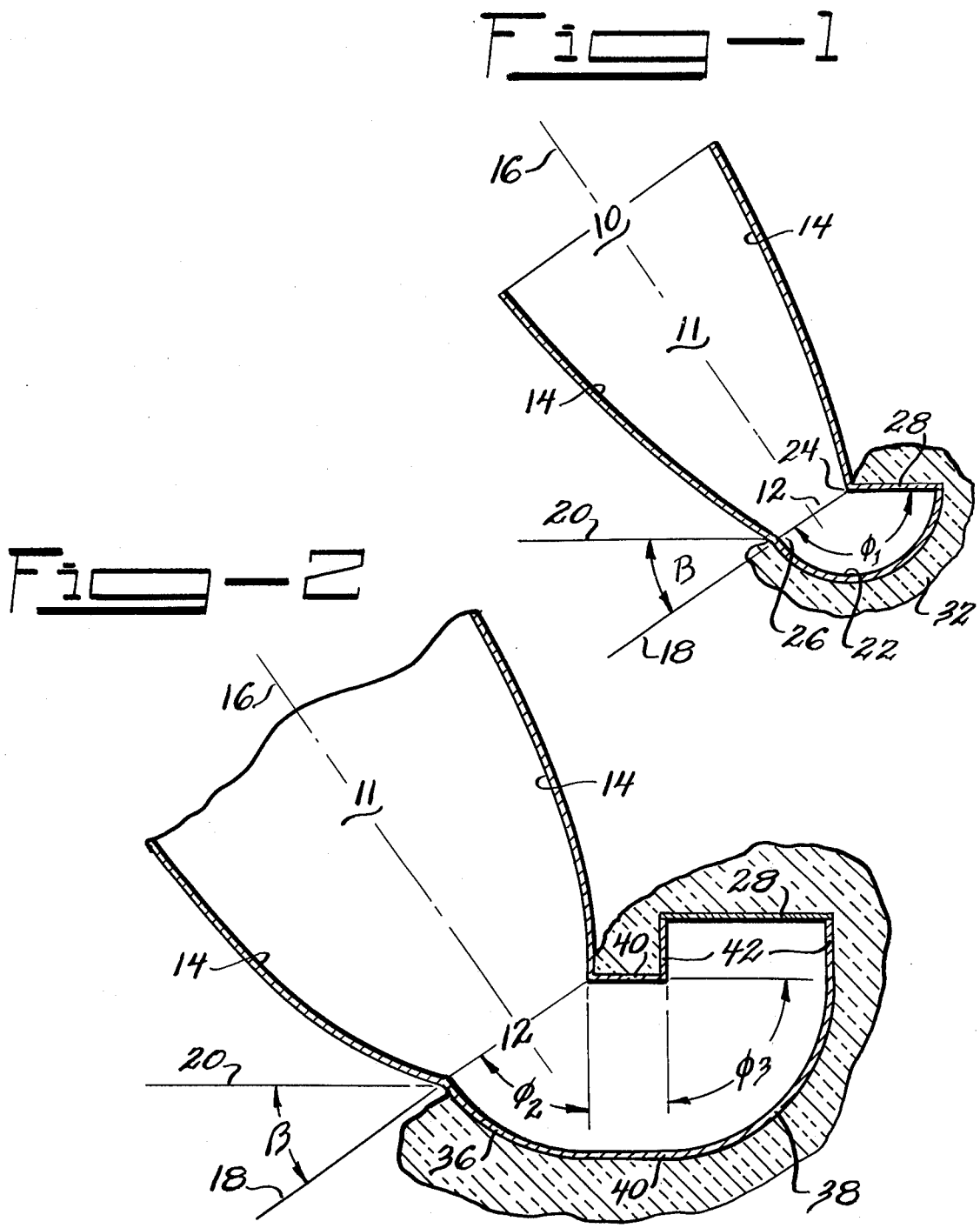

REDUCING HEAT LOSS FROM THE ENERGY ABSORBER OF A SOLAR COLLECTOR

CONTRACTUAL ORIGIN OF THE INVENTION

The invention described herein was made in the course of, or under, a contract with the UNITED STATES ENERGY RESEARCH AND DEVELOPMENT ADMINISTRATION.

BACKGROUND OF THE INVENTION

Cylindrical radiant energy collectors are trough-shaped nonimaging collectors which concentrate radiant energy. Such collectors are more particularly described in a prior U.S. application for Radiant Energy Collector, Ser. No. 492,074, filed July 25, 1974, and in a publication *Solar Energy*, Vol. 16, No. 2, pages 89–95, (1974).

It has been observed that such collectors exhibit significant natural convective losses. This arises from the positioning of the energy absorber at the exit aperture. As radiant energy, such as from the sun, is concentrated on the absorber it heats up. Since the heated surface of the absorber is facing upwards towards the entrance aperture, uninhibited convective currents develop, allowing heat to escape the heated surface of the absorber, thereby degrading collector performance.

It is therefore an object of this invention to improve the efficiency of cylindrical radiant energy collectors.

Another object of this invention is to reduce convective heat loss in a cylindrical radiant energy collector.

SUMMARY OF THE INVENTION

The collection efficiency of a cylindrical radiant energy collector is improved by reducing convective heat losses A curved wall section is positioned to receive radiant energy exiting the exit aperture of the collector and to direct received energy onto the energy absorber. The curved section is formed of a circular arc so that the reflected energy is neither concentrated nor dispersed when incident on the surface of the absorber by reflection from the curved section. The curved wall tends to direct energy exiting the exit aperture away from the exit aperture, allowing the surface of the absorber upon which the energy is incident to be placed facing downward and displaced from the exit aperture, inhibiting convective heat loss. Further isolation of the absorber can be achieved utilizing parallel straight side walls to guide the energy reflected from the exit aperture to the absorber.

BRIEF DESCRIPTION OF THE DRAWINGS

FIG. 1 shows the transverse cross section of a cylindrical collector with a circular wall section for directing energy exiting the exit aperture onto a displaced energy absorber, FIG. 2 shows another embodiment of the invention utilizing straight wall sections in addition to the circular section to further isolate the energy absorber.

DETAILED DESCRIPTION

Figure 3:
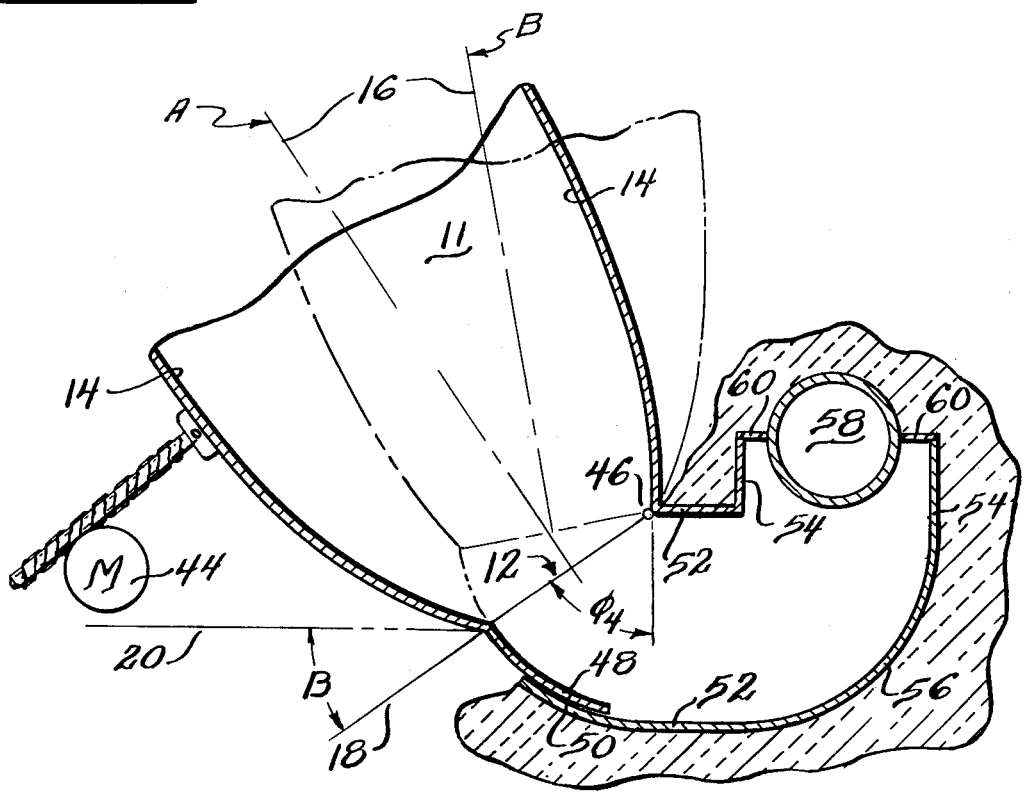
FIG. 3 shows another embodiment of the invention utilizing an absorber of circular cross section and a split reflector to allow for tilting of the collector.

Referring to FIG. 1, FIG. 2 and FIG. 3, there are shown transverse cross sections of means for improving the efficiency of cylindrical radiant energy collectors. A cylindrical collector is a trough-like device whose structure is formed by extending the cross sections shown in FIG. 1, FIG. 2 or FIG. 3 along an axis perpendicular to the plane of the cross section to form a trough-like structure, as will be described with reference to FIG. 4. The function of the collector is to concentrate radiant energy impinging within a given angle upon entrance aperture 10 of the collector 11 out the exit aperture 12. Each collector 11 includes opposing side walls 14 which direct energy incident upon the entrance aperture 10 within a given angle out the exit aperture 12. The actual generation of the contours of the side walls 14 may be according to the method found in the references previously referred to or any other method for developing side wall contours in a cylindrical collector. In practice, the optical axis of collector 11 is directed toward a source of radiant energy such as the sun, i.e., the reference axis 16, on either side of which is positioned, symmetrically or asymmetrically, walls 14, is pointed toward the sun. In prior art collectors, an energy absorber is positioned at exit aperture 12. The absorber heats up as energy is directed onto its surface and heat will be lost from the absorber by convection from the heated surface of the absorber out entrance aperture 10. The disclosed device provides a means of reducing this convective heat loss.

Referring to FIG. 1, there is shown one embodiment of the disclosed device. The exit aperture 12 of collector 11 is positioned within reference plane 18 perpendicular to the transverse cross section of collector 11. As we are dealing with an elevated energy source, such as the sun, plane 18 makes an angle $\beta$ with horizontal surface 20. Horizontal surface 20 is perpendicular to the direction of gravity and is generally parallel to the earth's surface. The angle $\beta$ ranges from 0° to 90° depending upon the positioning and design of collector 11. Radiant energy exiting exit aperture 12 is redirected by curved reflective wall 22. Curved wall 22 is in the form of the arc of a circle whose center is at either terminus of the exit aperture, e.g. in FIG. 1 the center is at terminus 24 and the wall extends from terminus 26. Exit aperture 12 extends along one radius of wall 22 and an energy absorber 28 is positioned along another radius on the opposite side of plane 18 from side walls 14. Best results are obtained with energy absorber 28 covering the entire radius from terminus 24 to wall 22, i.e. being the same width as exit aperture 12. The energy absorber 28 may be, for example, a photoelectric cell, a pipe containing fluid, or any other type of energy receiver responsive to radiant energy. In FIG. 1, the absorber 28 is shown planar in configuration as would be the case with a photovoltaic cell.

Wall 22 is circular so that all radiant energy exiting aperture 12 is directed to absorber 28 without further concentration or dispersion due to reflection by wall 22. Thus the level of concentration of collector 11 is not varied by wall 22 except due to possible losses due to absorption of energy by wall 22.

The angle between exit aperture 12 and absorber 28 is given by $\phi_1$. With $\phi_1 > 0°$ there will be less convective heat loss than with an absorber positioned at exit aperture 12. However, minimum convective heat loss will occur with absorber 28 parallel to horizontal axis 20 with the portion of absorber 28 upon which the energy is incident directed downward. Wall 22 may be formed by any well-known method of forming radiant energy reflective surfaces and may be made of a material which reflects substantially all of the solar energy exiting exit aperture 12, as for example aluminum or silver.

Some losses will occur in the energy reflected by walls 22 due to absorption of incident radiant energy by wall 22. From the standpoint of overall energy conversion, the radiant energy absorbed by wall 22 is not totally lost if the rear surface of wall 22 is thermally insulated with insulation 32, such as a urethane foam. With such insulation, wall 22 will operate at some elevated temperature and thus acts like a radiation shield for absorber 28, with the result that radiation loss from the heated surface of absorber 28 is reduced.

Referring to FIG. 2, there is shown a means for isolating exit aperture 12 from absorber 28. The wall for reflecting substantially all of the energy exiting exit aperture 12 onto absorber 28 includes two circular sections 36 and 38, determined by angles $\phi_2$ and $\phi_3$, and straight reflective wall sections 40 and 42. $\phi_2$ and $\phi_3$ follow the same rule as $\phi_1$ so that the combined effect of $\phi_2$ and $\phi_3$ to minimize effective heat losses is achieved with absorber 28 parallel to horizontal axis 20. Curved sections 36 and 38 bend energy away from the plane 18 of exit aperture 12 while straight sections 42 and 40, each of which includes equal length opposing sections, provides for lateral displacement of absorber 28 to reduce convective heat losses.

This arrangement has the advantages of reducing conductive heat losses since the heated surface of absorber 28 is removed from reflective walls 14 and reducing convection losses from the heated surface of absorber 28 by straight section 42 creating a stagnant air layer under absorber 28. The use of straight sections and curved sections to allow for displacement of absorber 28 from exit aperture 12 occurs without concentration or dispersion of energy exiting exit aperture 12. In view of this disclosure, further combinations of curved and straight sections at various angles are possible to give reduced convective heat loss from an absorber positioned at exit aperture 12, including having equal length straight sections parallel to axis 16 extending from the terminus points with the circular section beginning at the end of the straight sections.

Figure 4:
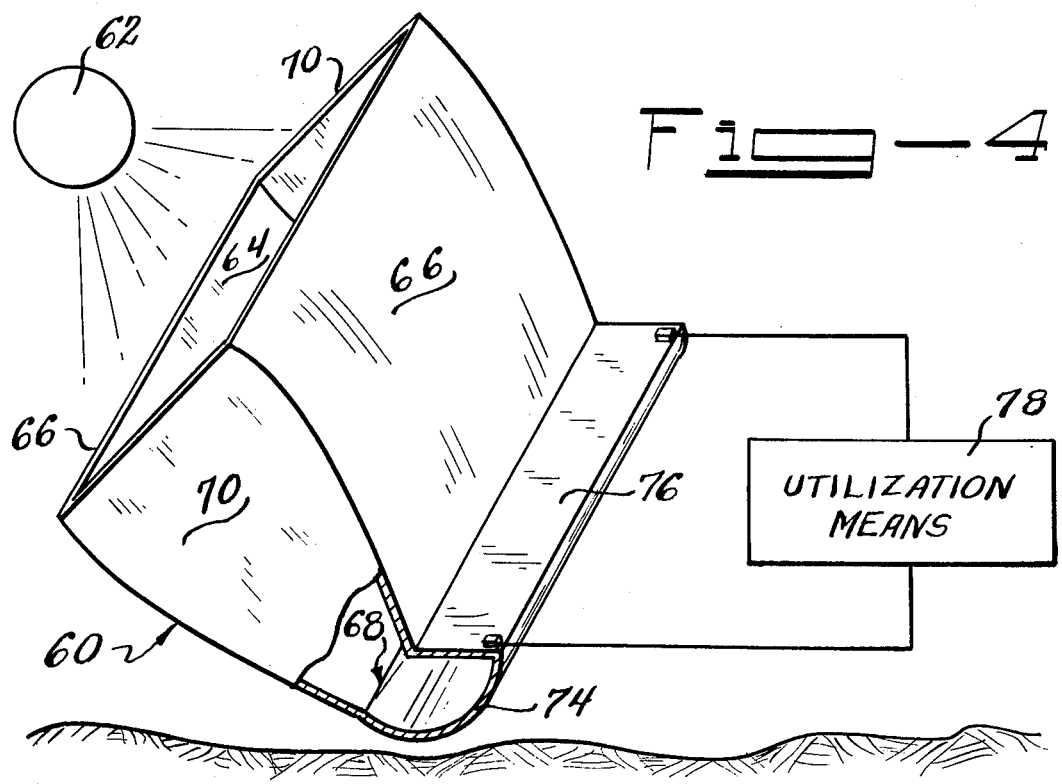
FIG. 4 shows the trough-shaped structure of this invention.

Referring to FIG. 3, there is shown a further embodiment of this invention. Certain collectors 11 require periodic adjustment of axis 16, i.e. the orientation of collector 11 with respect to the sun due to seasonal changes in the sun's position. This might be done with a motor 44 coupled to collector 11 for rotation about a fixed point such as terminus 46. Reducing convective heat loss can be obtained by splitting the wall which reflects energy exiting exit aperture 12 onto the absorber. In FIG. 3, the split is in the first circular section defined by $\phi_4$ with a circular section 48 pivoting along with collector 11 about terminus 46 and with circular section 50 stationary and overlapping section 48. Thus, the pivoting, say from position A to position B, merely varies $\phi_4$. The other sections are as shown in FIG. 2, with straight sections 52 and 54 and circular section 56. Normally tube-shaped absorbers are desired because of ease of fabrication. In FIG. 4, receiver 58 is tube-shaped, such as if it were a pipe with a coolant. Since the tube may not cover all of the length between straight walls 54, fins 60 may be coupled to pipe 58 in a well-known manner.

Referring to FIG. 4, there is shown a practical application of the principles herein disclosed. Here the collector 60 is used to receive energy from the sun 62. The energy incident on the entrance aperture 64 of collector 60 is directed by walls 66 out exit aperture 68. Collector 60 has a transverse cross section which is generated along an axis perpendicular to the cross section to form the trough-like or cylindrical collector 60. End walls 70 may be provided to enclose the structure. Wall 74 is provided to direct energy exiting exit aperture 68 onto absorber 76 without concentration or dispersion due to reflection by wall 24. Energy from absorber 76 is utilized by utilization means 78.

Note that this device may be used with a collector having a single side wall rather than the two wall units shown in FIGS. 1–4. In a one wall configuration the exit aperture is defined as the area onto which energy within a particular angle is reflected by the wall. The terminus points are the end points of that area and all of the designs shown in FIGS. 1–3 are applicable thereto.

The embodiments herein disclosed have referred to collection of radiant energy from the sun. It is to be understood that this device is not limited to collection of energy of this form. Any source positioned in an elevated manner wherein the absorber in the prior art would be positioned facing generally upward can achieve reduced convective losses utilizing the teachings of this invention.

The embodiments of the invention in which an exclusive property or privilege is claimed are defined as follows:

1. In a cylindrical radiant energy collector for concentrating radiant energy out the exit aperture thereof, the cross section of the exit aperture being along a reference axis and having a reference line passing therethrough perpendicular to the reference axis, the collector including concentrating reflective means positioned on one side of the reference axis for directing radiant energy out the exit aperture, a device for reducing convective heat loss from said collector, comprising:

an energy absorber, and bending reflective means for directing radiant energy exiting the exit aperture onto said energy absorber positioned on the opposite side of the reference axis from the concentrating reflective means and including a first curved wall and a first straight reflective section, said energy absorber being positioned such that the surface thereof upon which energy is directed by said bending reflective means faces substantially downward towards the earth's surface, said first curved wall having a cross section in a first plane coplanar with the reference axis and the reference line formed of a circular arc of radius equal to the width of the exit aperture along the reference axis and being positioned so that energy exiting said exit aperture in said first plane is directed in a direction from one side of the reference line to the other side of the reference line, said first straight reflective section having opposing parallel reflective walls each of whose cross section in said first plane is a straight line with said straight lines of equal length and with one of said straight lines extending downward from each end of said energy absorber thereby forming a stagnant air layer beneath said energy absorber reducing convective heat loss therefrom, said first straight section being so positioned with respect to said first curved wall and said circular arc described an angle of sufficient value that energy exiting the exit aperture is directed by said bending reflective means from said exit aperture to said surface of said absorber without concentration and without dispersion of said energy exiting the exit aperture.

2. The device of claim 1 wherein the center of said circular arc is at a terminus of the exit aperture along the reference axis and said circular arc extends from the other terminus of the exit aperture along the reference axis so that the exit aperture is along a first radius of said circular arc.

3. The device of claim 2 wherein said circular arc extends to a first point along a line directed downward from the center of said circular arc parallel to said straight lines of said first straight section and wherein said bending reflective means further includes a second curved wall having a cross section in said first plane formed of a circular arc of radius equal to the radius of said circular arc of said first curved wall, one end of said circular arc of said second curved wall being tangent to one straight line of said first straight section and the center of the circular arc of said second curved wall being at the end of the other straight line of said first straight section away from said absorber, and a second straight reflective wall section having opposing parallel reflective walls each of whose cross section in said first plane is a straight line with said straight lines of said second straight section of equal length, one of the straight lines of said second straight section extending from the center of the circular arc of said first curved wall to the center of the circular arc of said second curved wall and the other straight line of said second straight section being tangent to the circular arcs of both curved walls.

4. The device of claim 3 further including means for varying the tilt of the collector and wherein said first curved wall includes two overlapping circular sections whose cross sections in said first plane are in the form of concentric circular arcs, the circular arc of one of said circular sections being coupled to the collector and with variations in the tilt of the collector being capable of rotating with the collector, the angle circumscribed by the circular arc of said first curved wall being determined by the amount of overlap of the concentric arcs of said circular sections, with variation in the tilt of the collector said one circular section rotating to vary the angle circumscribed by the circular arc of said first curved wall proportional to the amount of variation in the tilt of the collector.

5. The device of claim 4 wherein said energy absorber extends along a longitudinal line perpendicular to said refernce axis and said reference line, said first and second curved walls and said first and second straight sections also extending in the direction of said longitudinal line and being parallel thereto to form a trough-like structure.

* * * * *